Figure 1:
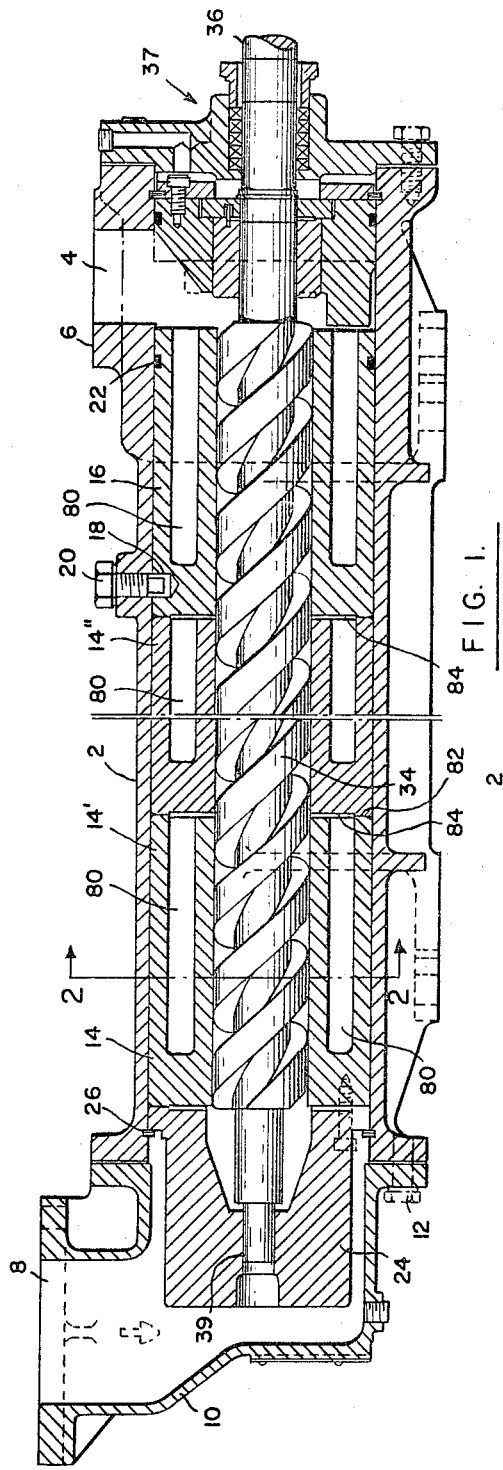

Aug. 30, 1966  M. B. SENNET  3,269,328
SCREW PUMPS OR MOTORS
Filed Sept. 28, 1964

INVENTOR.
MORGAN B. SENNET
BY
ATTORNEYS

United States Patent Office 3,269,328
Patented August 30, 1966

3,269,328
SCREW PUMPS OR MOTORS
Morgan B. Sennet, Erwinna, Pa., assignor to De Laval Turbine Inc., Trenton, N.J., a corporation of Delaware
Filed Sept. 28, 1964, Ser. No. 399,771
4 Claims. (Cl. 103—128)

This invention relates to screw pumps or motors and has particular reference to prevention of distortion of housings of multiple screw pumps or motors. While the invention is applicable to either pumps or motors, for convenience and consistency of description, references will be primarily made to pumps.

The problems involved and the objects of the invention may be best made clear by considering the type of pump exemplified in my Patent 2,924,181, dated February 9, 1960. That patent discloses a commercial type of multiple screw pump which, in the positive form of such pump, is used for delivering liquid at very high pressures. A power screw and a pair of idlers, the latter in many cases being desirably formed in sections, are mounted in bores generally consisting of a central bore for the power screw and a pair of bores for the idler screws, the latter bores intersecting the central bore. The usual arrangement involves two threads on the power screw and two threads on each of the idler screws, though as is known in this art the arrangements may be different, still consistent with a positive pumping action. Advantageously, and as shown in said patent, the bores are provided in a series of housing members arranged end to end in abutting relationship and free for slight relative movement to accommodate small misalignments. The power screw extends through all of these housing members, and advantageously sections of the idler screws correspond to the housing members and are independent of each other though, by reason of meshing with the power screw, they actually rotate in unison with only slight deviations of motion. Running clearances between the screws and between the screws and the bores of the housing members are very small and during operation essentially closed chambers are provided with the result that pumps of this type are positive and produce essentially continuous flow to deliver liquid in many uses at very high pressure.

The housing members referred to are mounted in a casing and by reason of the discharge pressure are forced toward the inlet end of the pump. In the conventional type of pump the portion of the casing surrounding the housing members generally need not be designed to withstand the outlet pressure, the housing members being forced tightly together in rather good liquid-tight fashion, the exteriors of the housing members being in communication with the pump inlet so that the casing is not subjected to high pressures despite minor leakage which may occur between the housing members.

Pumps of this type are compact and it is desirable that bulk of metal involved therein should be at a minimum. If a transverse section of a housing member is considered, neglecting the usual coring for reduction of weight, its outer boundary will be generally cylindrical conforming to the interior of the casing with which the housing members have generally only small clearance. The intersecting bores then present the picture that in an axial plane of the three axes of the screws the housing members will have relatively small wall thickness while in a plane at right angles to this the housing members have heavy wall thickness. (For balance if two idler screws are used they are diametrically opposite each other with respect to the axis of the power screw.) Considering the effect of high pressure, it will be evident that in the axial plane common to the three axes the housing will ordinarily be relatively weak with the result that the high pressure will produce a diaphragm-like action flexing the walls of the housing members outwardly about their thin wall portions as relatively yielding hinges. Several detrimental effects are thus produced:

Materials desirably used for the housing members often do not have strength to withstand the internal pressures and in the case of rapid hydraulic pressure cycling sufficient movements occur to cause fatigue of the metal and the housings split; even when the pressures involved are fairly constant, the diaphragm-like actions distort the bores out of cylindrical shape, and in particular, excessive bore loading results at the idlers.

The distortions which have been mentioned may, of course, be reduced by increasing the wall dimensions of the housing members or by adopting stronger materials, but these expedients are not practical.

Another possible solution to the problem is to provide communication between the interior bores and the exteriors of the housing members. But then the casing must withstand the delivery pressure of the pump. Furthermore, in a multiple-closure pump the pressures exerted outwardly against the housing members vary greatly along the length of the pump, and if a uniform pressure was exerted on the exterior of the housing members there would still not be proper balance throughout the length of the pump. If an expedient of this type was adopted, therefore, packings would be required to isolate from each other the clearance regions between the individual housing members and the casing. This type of solution to the problem is, therefore, also impractical.

In accordance with the present invention the problems involved are solved by an arrangement which, in effect, eliminates the diaphragm-like action as its effects would be seen from the standpoint of the bores. In brief, this is accomplished by providing openings within the heavy walls which exist outside the power screw bore at positions transverse to the common axial plane of the three screw axes. These openings desirably individual to the housing members receive liquid under pressures corresponding to the pressures within the bores of these members.

Figure 2:
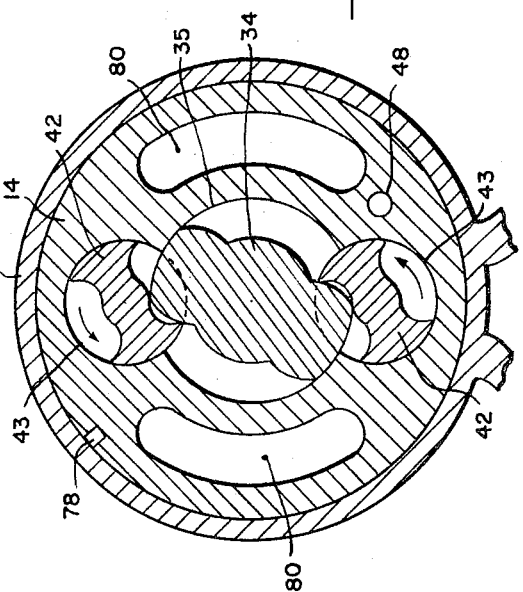

The general object of the invention is the achievement of the foregoing results, and further objects which relate to the achievement of the desired results in practical fashion will become more apparent from the following description, read in conjunction with the accompanying drawing in which:

FIGURE 1 is an axial section taken through a screw pump of the type mentioned, the section being on an axial plane transverse to the common plane of the screw axes; and FIGURE 2 is a transverse section taken on the plane indicated at 2—2 in FIGURE 1.

The pump illustrated is primarily conventional and only sufficient is shown to illustrate the present invention. Reference may be made to my Patent 2,924,181, referred to above, for details.

A casing 2 is provided at its right-hand end with a liquid outlet 4 provided with a coupling surface 6 to which may be tightly fitted a suitable delivery conduit. Throughout the major portion of its length this casing may be provided with relatively thin walls since it is not required to withstand the high pressures against which the pump may deliver. A cover 10 is secured to the left-hand end of the casing and is provided with the inlet passage 8 which communicates with the left-hand entrance portions of the screws. The cover is bolted to the casing as indicated at 12.

The casing is provided with a cylindrical bore in which are located the screw housing members 14, 14', 14" and 16. While in a short length pump there may actually be only one of these housing members, in the case of high pressure pumps it is desirable to have a number of these housing members since in such pumps multiple screw closures are desirable to minimize backward liquid leakage and the length involved are such that a single housing member would be difficult to produce for alignment with a power screw and would also be subject to thermal and pressure distortion. Utilizing separate housing members, as illustrated, and also desirably separate sections for each of the idler screws, a better assembly is secured. In the present instance the housing members are desirably cylindrical and provide close sliding fits in the cylindrical bore of the casing. The right-hand housing member 16 is essentially like the others but is desirably held against rotation, though with some play, by the entry into an opening 18 thereof of the end of a screw 20 threaded into the casing. An O-ring 22 provides a liquid-tight seal to separate the exterior clearance between the housing members and the casing from the delivery space communicating with the outlet 4. The assembly of housing members is urged toward the left by the outlet pressure against a member 22 the left-hand movement of which is limited by a snap ring 26 secured in a groove in the interior of the casing 2.

The housing members are provided with central bores 35 receiving the power screw 34 with close running clearance. The power screw has a shaft extension 36 which passes through the packing and thrust bearing arrangement which is conventional and indicated generally at 37. A shaft extension at the left-hand end of the power screw runs in a bore 39 in the member 24. Each of the housing members is also provided with the idler bores 43 intersecting the bore 35 in conventional fashion and receiving the idler sections 42. These sections mesh with the power screw 34 to provide the well-known arrangement giving rise to closed chambers which during operation progress from left to right along the axes. While theoretically the pump may be positive, because of running clearances between the screws and between the screws and the bore walls there is leakage and in a high pressure pump a pressure gradient exists from the high pressure at the discharge to the low pressure at the inlet along the lengths of the screws. This means that the individual housing members are subjected to quite different interior pressures.

A typical cross-section is as illustrated in FIGURE 2, and it will be evident that if the housing members exterior of the screw bores were solid there would be a considerable wall thickness along a horizontal diameter as shown in FIGURE 2, and a comparatively thin wall thickness along a vertical diameter. As a result of this, under high pressures, particularly at the outlet regions of the pump, the diaphragm-like action could occur to produce the undesired results mentioned above.

Mention at this point may be made of the axially extending opening 48 which is provided in conventional fashion to deliver liquid at the delivery pressure to thrust bearing arrangements for the idlers. Details of this are not shown, but by its use the high pressure fluid may be delivered through the housing members, utilizing coupling tubes between them to provide a continuous passage. It is desirable to provide communication between the clearances exterior to the housing members and interior to the casing, and for this purpose grooves 78 are provided communicating with each other.

Considering now the matters particularly directed to the present invention, the housing members are provided with openings 80 on opposite sides of the power screw bore and extending circumferentially about the power screw bore between, but out of communication with, the idler screw bores. In a desirable arrangement these openings 80 are closed from the left-hand ends of the housing members but are open at their right-hand ends. It will be seen that each of them provides a wall between itself and the power screw bore 35. The circumferential faces at the right-hand ends of the housing members are, at their outer diameters, machined to provide tight fitting engagements with the adjacent housing members as indicated at 82, but at their inner diameters they are machined to provide slight clearances, for example, of the order of a thousandth of an inch, as indicated exaggeratedly at 84 to provide communication between the openings 80 and the power screw bore. When the pump is operating, the housing members are pushed tightly together toward the left of FIGURE 1, and little leakage is permitted from the openings 80 outwardly to the clearance between the housing members and the casing. Whatever liquid thus flows passes outwardly through the openings 78 provided in all of the housing members 14, 14', 14" but not through the right-hand housing member 16, and this communicates with the inlet region at the left of the assembly. The pressure existing in this clearance, therefore, is essentially inlet pressure, and the casing is relieved of the high outlet pressure. The openings 80, however, have communication through the clearances 84 with the power screw bore 35, and as will be evident, considering the closures between the screws, the pressure within any opening 80 corresponds at least fairly closely to that existing in the adjacent portion of the power screw bore. Accordingly, the wall of each housing member between its openings 80 and the power screw bore is subjected to a balanced pressure so that the interior of this wall maintains its dimensional characteristics. The walls of the housing members exterior to the openings 80 may be flexed outwardly by the pressure within the openings, but are arrested by the casing which only exerts reasonable mechanical pressure thereon, since, of course, the housing members are inherently quite rigid and tend to a major degree to resist any extensive flexure.

Note may be taken at this point that the distortions to which references are made are only very slight, and are not of particular significance from the standpoint of their production of relative movements between non-moving parts; they are significant between relatively moving parts only because of the very slight running clearances which are involved. Desirably the clearances between the housing members and the casing are quite small, merely permitting sliding fits, so that the surfaces may engage during operation.

It will be evident from the foregoing that whatever diaphragm action does exist by reason of the high pressures involved it is substantially solely at the regions exterior to the openings 80, and by engagement with the casing flexure about the wall portions in a plane common to the rotational axes is so limited that metal fatigue is prevented.

While the description has been directed to pumps, it will be evident that similar considerations apply to the uses of the same type of multiple screw assemblies used as motors, in which case the introduced driving liquid may be at very high pressure to produce rotation of the screws and high shaft output torques.

It will be evident that various changes in details may be made without departing from the invention as defined in the following claims.

What is claimed is:

1. A hydraulic screw device comprising a casing, at least one housing member within the casing, a power screw and at least one idler screw intermeshing with said power screw, said screws rotating in respective intersecting bores in said housing member, said housing member having at least one opening therein extending about the power screw bore to provide a chamber closed with respect to the exterior of the housing member and a wall between it and the power screw bore, and means providing communication between said chamber and the portion of the power screw bore interior thereof.

2. A device according to claim 1 in which a plurality of said housing members are arranged end to end in abutting relationship.

3. A device according to claim 1 in which there are two idler screws located on diametrically opposite sides of said power screw and in which there are two of said openings extending about the power screw bore at opposite sides thereof between, but not communicating with, the idler screw bores.

4. A device according to claim 3 in which a plurality of said housing members are arranged end to end in abutting relationship.

References Cited by the Examiner

UNITED STATES PATENTS

| | | | |
|---|---|---|---|
| 2,111,568 | 3/1938 | Lysholm et al. | 230—143 |
| 2,176,787 | 10/1939 | Burghauser | 103—128 |
| 2,188,702 | 1/1940 | Burghauser | 103—128 |
| 2,592,476 | 4/1952 | Sennet | 103—128 |
| 2,874,643 | 2/1959 | Bourke | 103—117 |
| 2,924,181 | 2/1960 | Sennet | 103—128 |

FOREIGN PATENTS 541,601   12/1941   Great Britain.

MARK M. NEWMAN, *Primary Examiner.*

W. J. GOODLIN, *Assistant Examiner.*